United States Patent [19]

Hessert et al.

[11] 4,079,785
[45] Mar. 21, 1978

[54] OIL RECOVERY METHOD USING IN SITU-PARTITIONING SURFACTANT FLOOD SYSTEMS

[75] Inventors: James E. Hessert; David F. Boneau; Richard L. Clampitt, all of Bartlesville, Okla.

[73] Assignee: Phillips Petroleum Company, Bartlesville, Okla.

[21] Appl. No.: 779,412

[22] Filed: Mar. 18, 1977

Related U.S. Application Data

[63] Continuation-in-part of Ser. No. 656,771, Feb. 9, 1976, abandoned.

[51] Int. Cl.² .............................................. E21B 43/22
[52] U.S. Cl. .................................. 166/273; 166/252; 252/8.55 D
[58] Field of Search ............................ 166/273–275, 166/252, 272; 252/8.55 D

[56] References Cited

U.S. PATENT DOCUMENTS

| | | | |
|---|---|---|---|
| 3,330,344 | 7/1967 | Reisberg | 166/275 X |
| 3,348,611 | 10/1967 | Reisberg | 166/275 |
| 3,373,809 | 3/1968 | Cooke, Jr. | 166/273 |
| 3,469,630 | 9/1969 | Hurd et al. | 166/273 X |
| 3,500,922 | 3/1970 | O'Brien et al. | 166/273 |
| 3,605,895 | 9/1971 | Jones | 166/273 |
| 3,770,632 | 11/1973 | Gilliam et al. | 166/273 X |
| 3,777,818 | 12/1973 | Feuerbacher et al. | 166/274 |
| 3,802,508 | 4/1974 | Kelly et al. | 166/272 |
| 3,885,628 | 5/1975 | Reed et al. | 166/273 X |
| 3,981,361 | 9/1976 | Healy | 166/274 X |

FOREIGN PATENT DOCUMENTS

913,349  10/1972  Canada .............................. 166/274

*Primary Examiner*—Stephen J. Novosad

[57] ABSTRACT

Samples of oil from a formation to be flooded are equilibrated with a series of surfactant systems comprising a petroleum sulfonate surfactant, a cosurfactant having limited solubility in water and brine. By using sulfonates having an equivalent weight within the range of 375 to 500 and using cosurfactants having a solubility in water varying from 0.5 to 20 grams per 100 grams of water, some of the mixtures will partition into two or more phases while others will not. Then a separate sulfonate-cosurfactant-brine system is made up corresponding to one of those which partitions and the system is injected into the reservoir where on contact with the oil it forms a multiphase bank.

13 Claims, 1 Drawing Figure

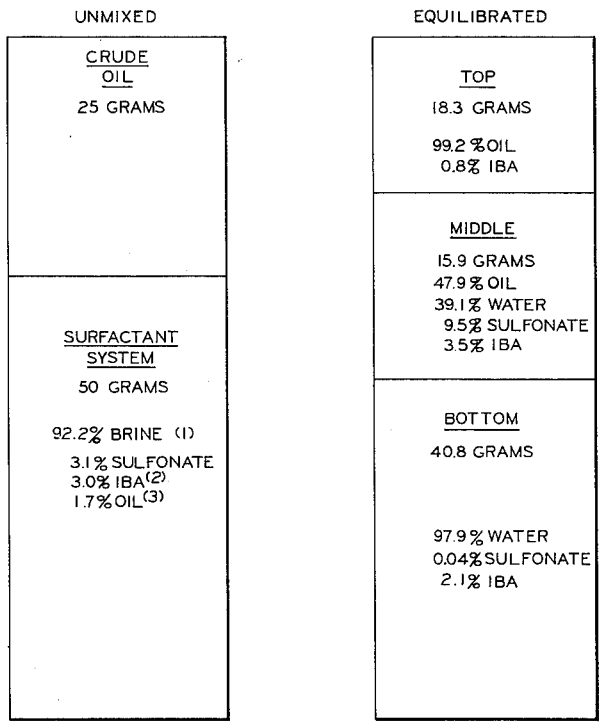

(1) FRESH WATER PLUS 15,000 PPM NaCl
(2) ISOBUTYL ALCOHOL
(3) UNREACTED OIL FROM THE SULFONATE

| UNMIXED | EQUILIBRATED |
|---|---|
| CRUDE OIL<br>25 GRAMS | TOP<br>18.3 GRAMS<br>99.2 % OIL<br>0.8 % IBA |
| SURFACTANT SYSTEM<br>50 GRAMS<br>92.2% BRINE (1)<br>3.1% SULFONATE<br>3.0% IBA (2)<br>1.7% OIL (3) | MIDDLE<br>15.9 GRAMS<br>47.9 % OIL<br>39.1 % WATER<br>9.5 % SULFONATE<br>3.5 % IBA<br><br>BOTTOM<br>40.8 GRAMS<br>97.9 % WATER<br>0.04 % SULFONATE<br>2.1 % IBA |

(1) FRESH WATER PLUS 15,000 PPM NaCl
(2) ISOBUTYL ALCOHOL
(3) UNREACTED OIL FROM THE SULFONATE

1

OIL RECOVERY METHOD USING IN SITU-PARTITIONING SURFACTANT FLOOD SYSTEMS

CROSS REFERENCE TO RELATED APPLICATION

This is a continuation-in-part of copending Ser. No. 656,771, filed Feb. 9, 1976, now abandoned.

BACKGROUND OF THE INVENTION

This invention relates to recovery of oil from a subterranean reservoir through the use of surfactant flooding.

It has long been known that the primary recovery of oil from a subterranean formation leaves a substantial amount of the initial oil still in the formation. This has led to the use of what is commonly referred to as secondary recovery or water flooding wherein a fluid such as brine is injected into a well to force the oil from the pores of the reservoir toward a recovery well. However, this technique also leaves substantial amounts of oil in the reservoir because of the inability of the water to wet the oil and the capillary retention of the oil. Accordingly, it has been suggested to use a surfactant in the water flooding processes. It has been found that the use of surfactants can reduce the interfacial tension between the oil and the water to such an extent that substantially increased quantities of oil can be displaced.

However, there are other variables involved in addition to the wetting ability of the water, and in fact conventional surfactant flooding techniques also leave substantial amounts of oil in place.

Further efforts to better remove residual oil from subterranean deposits have focused on the use of microemulsions. In accordance with this technique, a microemulsion is prepared by mixing oil with brine and surface-active agents. Some systems are capable of achieving good results in removing oil from the pores of a subterranean formation. However, there is an obvious drawback to any system for recovering oil which involves the injection of oil which has already been recovered back into the ground. Another drawback is high surfactant usage due to adsorption of the surfactant on formation rock.

SUMMARY OF THE INVENTION

It is an object of this invention to achieve recovery of oil in a manner comparable to that obtained using microemulsions but without the affirmative introduction of oil back into the ground;

It is another object of this invention to reduce the adsorption of the surface-active components of surfactant flood systems on formation rock.

It is a further object of this invention to tailor a surfactant flooding system to the particular characteristics of the oil being recovered; and It is yet a further object of this invention to sweep residual oil from the pores of a subterranean formation by means of a multiphase bank formed in situ.

In accordance with this invention, samples of oil from the reservoir to be flooded are mixed with brine and a series of sulfonate surfactants having an average equivalent weight within the range of 375 to 500 and a series of cosurfactants having solubility in water within the range of 0.5 to 20 grams per 100 grams of water. Thereafter a brine-surfactant-cosurfactant system corresponding to one of those which formed a multiphase system on mixing is introduced into the formation where a multiphase bank is formed in situ.

DESCRIPTION OF THE DRAWINGS

In the drawing, forming a part hereof there is shown in bar graph form the composition of a mixture of oil and a surfactant system on initial contact and after the mixture has reached equilibrium.

DESCRIPTION OF THE PREFERRED EMBODIMENTS

The surfactant to be used in this invention is a petroleum sulfonate having an average equivalent weight within the range of 375 to 500 preferably about 400–425 more preferably 407–417. These sulfonates are well known in the art and are sometimes referred to as alkyl aryl sulfonates. They are also sometimes referred to as petroleum mahogany sulfonates. Generally, these sulfonates contain one monovalent cation, which may be any of the alkali metals or the ammonium ion. These sulfonates can be produced in the manner known in the art by the treatment of appropriate oil feedstocks with sulfuric acid and then neutralizing with an alkali metal or ammonium hydroxide. The equivalent weights referred to are, as noted, average equivalent weights and there may be present significant amounts of sulfonates having an equivalent weight as low as 200 and as high as 650.

While it is an object of this invention to achieve the advantages of microemulsion flood techniques without the injection of additional oil, this is not to preclude the possibility of a small amount of unreacted oil being unavoidably present in the sulfonate. The sulfonate surfactant is used in an amount within the range of 3 to 12 preferably 4 to 8 weight percent based on the weight of water.

The cosurfactant can be any alcohol, amide, amine, ester, aldehyde or ketone containing 1–20 carbon atoms and having a solubility in water within the range of 0.5 to 20, preferably 2 to 10 grams of water. Preferred materials are the $C_4$ to $C_7$ alkanols or mixtures thereof. Most preferred are $C_4$ and $C_5$ alcohols having a solubility within the above range. Isobutyl alcohol with a solubility of 9.5 grams per 100 grams of water is particularly suitable. Other preferred cosurfactants include secondary butyl alcohol, n-butyl, n-amyl and isoamyl alcohol. Alcohols such as isopropyl, which are known in the art to be useful in surfactant-flooding systems generally, are not suitable for use in this invention because of the undesirably high solubility in water which requires going to extremely high salt concentration and/or extremely high sulfonate equivalent weight to give an operable system which is not desirable. The cosurfactant is utilized in an amount within the range of about 1 to 12, preferably 3–9 weight percent based on the weight of water.

The brine constitutes 85 to 95 weight percent of the total composition including brine, surfactant, and cosurfactant. The brine is made up of water and an electrolyte which is generally predominantly sodium chloride. The electrolyte is present in the water in an amount within the range of 250 to 100,000, preferably 2,000 to 50,000, parts per million total dissolved solids (TDS). In systems using lower average equivalent weight sulfonates (below about 435) and/or more soluble cosurfactants (more than 5 g/100 g water) 10,000 preferably 15,000 to 30,000 TDS may be more desirable. Other electrolytes which may be used or which may be present in minor amounts in combination with the sodium chloride include potassium chloride, calcium chloride, magnesium chloride, sodium sulfate, ammonium chloride, and the like. Large amounts of divalent ions are undesirable.

The small scale partitioning step can be carried out in several ways. The variables in the in situ-partitioning surfactant flood system include the nature of the surfactant, its concentration, the nature of the cosurfactant, its concentration, and the nature and concentration of the brine. These variables are all inter-related such that some combinations of ingredients and concentrations can achieve the benefits of in situ-partitioning which other closely related combination will not. Hence, a series of solutions can be prepared wherein one or more ingredients or their concentrations is kept constant while the remaining ingredients and concentrations are varied. In practice, availability or cost considerations will cause one or more ingredients or their concentrations to be relatively fixed and thus the series will contain variations of the other ingredients to define the desirable partitioning system.

The surfactant solutions to be contacted with the crude oil should be stable, that is, they should be homogeneous and preferably clear solutions. Such stability is desirable for convenience in storage and handling and stability at temperatures of the formation is particularly desirable.

About 1–3 parts, generally about 2 parts, of surfactant solution and about 1 part of crude oil, by weight, are equilibrated by any suitable means such as vigorous shaking, vigorous stirring, and the like. The crude oil should be representative of the formation into which the surfactant system will be injected. However, for convenience the gaseous or easily volatilizable components of the crude, which might interfere with the small scale partitioning step, may have been removed. The temperature of the equilibration should approximate the temperature of the formation.

The resulting equilibrated mixture is then allowed to stand undisturbed for about 6–24 hours (or less if partitioning occurs sooner) to determine its partitioning effectiveness. The temperature of the mixture during this period should also approximate the temperature of the formation to be treated.

Partitioning is considered to have occurred if (1) the equilibrated and settled mixture separates into 2 or more phases, and (2) an oil-rich microemulsion phase which contains at least 85% and preferably at least 95% of the petroleum sulfonate surfactant is present as one of the phases.

In practice, the partitioning surfactant solutions will separate into a lower aqueous phase which is predominantly brine and which contains some of the cosurfactant but very little of the petroleum sulfonate surfactant. This aqueous phase is generally in contact with the upper oil-rich and surfactant-rich microemulsion phase. The microemulsion phase generally contains substantial amounts of oil and brine with some cosurfactant. Most importantly, almost all of the petroleum sulfonate surfactant will have partitioned itself into this oil-rich microemulsion phase.

In some instances of a partitioned surfactant system, depending upon the nature and concentration of the ingredients, the microemulsion phase can be in contact with an upper oil phase. The oil phase is almost completely oil with very minor amounts of any of the ingredients of the original surfactant solution.

By subjecting a given surfactant solution or a series of surfactant solutions to the above-described partitioning procedure, the surfactant solutions which are capable of partitioning in situ can be identified. Thus, the present invention provides a method to select, optimize, or monitor surfactant solutions for use in surfactant flood operations.

The surfactant system of this invention is injected into an injection well or wells in a manner well known in the art in water-flooding operations. On contacting of the oil in the formation, a three-phase bank is formed in situ comprising (1) a leading phase of said reservoir oil containing a small amount of said cosurfactant, (2) a middle microemulsion phase comprising (a) oil from said reservoir and (b) water, surfactant and cosurfactant from said injected surfactant system, said surfactant being at a substantially higher concentration in said middle phase than in said injected surfactant system; and (3) a trailing phase comprising the majority of said water from said injected surfactant system, a portion of said cosurfactant from said injected surfactant system and a minor portion of said surfactant from said injected surfactant system. In the actual formation the variations in structure are such that the middle and trailing phases do not necessarily remain in the middle and end, respectively, in all places at all times but rather the multiple phases may manifest themselves on a microscopic level, i.e., within individual pores or small structures. The figure shows a typical example of the formation of a three-phase bank, the data incorporated into FIG. 1 having been obtained from a laboratory experiment wherein crude oil was mixed with the indicated surfactant system.

A mobility buffer is injected behind the surfactant system. Examples of useful mobility buffers include aqueous and non-aqueous fluids containing mobility-reducing agents such as high molecular weight partially hydrolyzed polyacrylamides, polysaccharides, soluble cellulose ethers, and the like. The mobility buffer comprises 50 to 20,000, preferably 200 to 5,000, parts per million of said mobility reducing agent in said fluid. The mobility buffer can be graded, that is, its concentration can be relatively high at the leading edge and relatively low at the trailing edge. For instance, the mobility buffer can start at 2,500 ppm PAM and end at 250 ppm. These mobility buffers are known in the art.

Finally, a drive fluid is injected behind the mobility buffer to force oil contained in the reservoir toward a recovery well. The drive material can be aqueous or non-aqueous and can be liquid, gas or a combination of the two. Generally, it is formation water or water similar thereto. When a hard brine is the drive liquid it can be beneficial to precede the brine with a slug of relatively fresh water.

It is preferred, although not essential to the invention, that the surfactant system be preceded by a preflush solution. Such preflush operations are known in the art and can be carried out utilizing a brine compatible with the surfactant system, such as one containing 2,000 to 50,000 parts per million TDS, predominantly sodium chloride. A brine solution of the type used to make up the surfactant system is particularly suitable.

The preflush if employed will generally be utilized in an amount within the range of 0.01 to 2.0, preferably 0.25 to 1 pore volume, based on the pore volume of the total formation being treated. The surfactant system is injected in an amount within the range of about 0.001 to 1.0, preferably 0.01 to 0.25 pore volume based on the pore volume of the total formation being treated.

The mobility buffer is injected in an amount within the range of about 0.001 to 1.0, preferably 0.01 to 0.25 pore volume, based on the pore volume of the total formation. The drive fluid is simply injected until all feasible recovery of the oil has been made.

The invention is effective in oil-wet reservoirs where tertiary recovery is inherently difficult and is extremely effective in recovery of oil from water-wet sandstone reservoirs. Also, because of the extremely low adsorption of the sulfonate on the rock, the invention is of great advantage in flooding dolomite reservoirs.

In the examples which follow, a mid-continent crude oil was used to demonstrate the process of the present invention. This crude oil is described as follows:

| Crude Oil Analysis Summary | |
|---|---|
| General Crude Tests | |
| Type-Base | Intermediate |
| Gravity, ° API at 60° F. | 39.1 |
| Pour Test, ° F. | +20 |
| Sulfur, % | 0.15 |
| Hydrogen Sulfide | negative |
| Yields: (Hempel) | |
| Gasoline: (408° F. - EP | |
| Percent | 30.9 |
| Octane No. - Research (Clear) | 41.4 |
| Octane No. - Research (+3 ml TEL) | 71.7 |
| Kerosene: | |
| Percent | 16.8 |
| Gravity | 41.9 |
| Total Gas Oil, % | 26.5 |
| Still Residue: | |
| Percent | 25.3 |
| Gravity | 21.1 |
| Carbon Residue, % | 3.5 |
| Vacuum Gas Oil Characterization: | |
| % $C_A$ | 10.82 |
| % $C_N$ | 19.32 |
| SCF | 11.54 |
| VGC | 0.8395 |

EXAMPLE I

A surfactant solution was prepared containing 92.0 percent brine, 5.0 percent petroleum sulfonate surfactant and 3.0 percent isobutyl alcohol cosurfactant, by weight. The brine was essentially a fresh water (about 600 ppm TDS) to which had been added 15,000 ppm NaCl. The sulfonate surfactant was a sodium petroleum sulfonate (Witco Petronate TRS 10-410) which had a relatively narrow molecular weight distribution and an average equivalent weight of 417. This commercial material contained about 62 weight percent active material, about 34% unsulfonated oil and about 4 weight percent water. It has 0.5 percent inorganic salts, mostly sodium sulfate and sodium sulfite. The pH is relatively high, a solution thereof in water has a pH of 8-10.

The surfactant solution was prepared by simple mixing at 120° F. It was a clear, essentially colorless solution and was stable in that it did not separate into phases.

A 50 g portion of this solution was then equilibrated with 25 g of the crude oil described above by vigorously shaking in a graduated cylinder. The mixture was allowed to stand undisturbed overnight at 120° F.

This system separated into 3 phases. The bottom phase was a clear 40.8 g solution containing 97.9 percent brine, 2.1 percent isobutyl alcohol and 0.40 percent sulfonate, by weight. The middle phase was a 15.9 g microemulsion containing 47.9 percent oil, 39.1 percent brine, 9.5 percent sulfonate and 3.5 percent isobutyl alcohol, the oil being the continuous phase. The 18.3 g upper phase was essentially oil containing 0.8 percent isobutyl alcohol.

This equilibration test is diagrammatically shown in FIG. 1. The surfactant system is considered to have partitioned in that: three phases were observed to form; an oil-rich microemulsion phase over an essentially clear aqueous phase was present; and, most importantly, the sulfonate surfactant had partitioned itself almost completely (about 99%) into the microemulsion phase where it is less susceptible to loss by adsorption on formation surfaces.

In other related runs using this partitioning procedure and using these same surfactant solution ingredients, it was found that the volume of the microemulsion phase (middle phase) was always proportional to the sulfonate concentration in the original aqueous surfactant solution. This indicates that the sulfonate concentration in the microemulsion phase, which will form in situ in the formation, tends to remain constant regardless of the volume of the microemulsion phase. Thus, in a formation where adsorption slowly decreases the amount of sulfonate in the system, the volume of the microemulsion phase should shrink as petroleum sulfonate is lost to the rock. However, the ability of the microemulsion phase to displace oil should remain constant since its composition does not change appreciably.

EXAMPLE II

In a manner similar to that of Example I, a series of surfactant solutions was prepared, each containing a petroleum sulfonate surfactant, an alcohol cosurfactant and a brine. Both the nature and the concentration of these ingredients were varied to provide a number of different solutions.

The sulfonate surfactants employed were closely related sodium petroleum sulfonates (Witco) but which varied in average equivalent weight. These included equivalent weights of 350(TRS-50); 407(TRS-10-395); 417(TRS-10-410); 450(TRS-16); and 494(TRS-18).

The alcohols included in the series varied in their solubility in water as follows:

| Alcohol | Solubility, g/100 g $H_2O$ |
|---|---|
| isopropyl (IPA) | ∞ |
| n-butyl (NBA) | 7.9 |
| isobutyl (IBA) | 9.5 |
| t-butyl (TBA) | ∞ |
| sec-butyl (SBA) | 12.5 |
| isoamyl (IAA) | 2.9 |

Each of these solutions was prepared by simple mixing at 120° F. Some combinations of ingredients were unstable in that they did not remain homogeneous but most formed clear, essentially colorless solutions.

Each of these solutions was then subjected to the partitioning test described in Example I. The results of these tests are shown in Table I.

TABLE I

Partitioning Data - Aqueous Surfactant Solutions at 120° F
(50 grams Solution + 25 grams crude oil)

| Run No. | Sulfonate Ave. Eq. Wt. | Sulfonate Wt. % | Alcohol Conc. & Type | NaCl, ppm | 120° F Stable | Partition | No. Phases | Remarks |
|---|---|---|---|---|---|---|---|---|
| 1 | 350 | 6 | 3% IPAA | 15,000 | yes | no | — | Equivalent Weight of Sulfonate too low for partitioning to occur in these solutions |
| 2 | 350 | 6 | 3% IBA | ↓ | yes | no | — | |
| 3 | 350 | 6 | 3% TBA | | yes | no | — | |
| 4 | 350 | 6 | 3% NBA | ↓ | yes | no | — | |
| 5 | 350 | 6 | 3% SBA | | yes | no | — | |
| 6 | 350 | 6 | 1.5% IAA | ↓ | yes | no | — | |
| 7 | 350 | 6 | 0.5% IAA | | yes | no | — | |
| 8 | 407 | 6 | 3% IPA | 15,000 | yes | no | — | |
| 9 | 407 | 6 | 3% IBA | ↓ | yes | yes | 3 | |
| 10 | 407 | 6 | 3% TBA | | yes | no | — | |
| 11 | 407 | 6 | 3% NBA | ↓ | yes | yes | 2 | |
| 12 | 407 | 6 | 3% SBA | | yes | no | — | |
| 13 | 407 | 6 | 0.5% IAA | ↓ | no | no | — | |
| 14 | 407 | 6 | 1.5% IAA | | no | yes | 2 | |
| 15 | 407 | 6 | 0.5% IBA | ↓ | no | no | — | |
| 16 | 407 | 6 | 1% IBA | | no | no | — | |
| 17 | 407 | 6 | 2% IBA | ↓ | no | no | — | |
| 18 | 407 | 6 | 3% IBA | 10,000 | yes | no | — | |
| 19 | 407 | 6 | 3% IBA | 20,000 | no | yes | 4 | Small layer brown emulsion |
| 20 | 407 | 6 | No alcohol | 15,000 | no | no | — | |
| 21 | 417 | 6 | 3% IBA | 15,000 | yes | yes | 3 | |
| 22 | 417 | 6 | 3% IPA | ↓ | yes | no | — | |
| 23 | 417 | 6 | 3% TBA | | yes | no | — | |
| 24 | 417 | 6 | 3% NBA | ↓ | yes | yes | 2 | |
| 25 | 417 | 6 | 3% SBA | | yes | no | — | appears to be close to partitioning |
| 26 | 417 | 6 | 1.5% IAA | ↓ | no | yes | 2 | |
| 27 | 417 | 6 | 0.5% IAA | | yes | yes | 2 | |
| 28 | 417 | 6 | No alcohol | ↓ | yes | no | — | |
| 29 | 417 | 6 | 0.5% IBA | | no | no | — | |
| 30 | 417 | 6 | 1.0% IBA | ↓ | yes | no | — | |
| 31 | 417 | 6 | 2% IBA | | yes | yes | 3 | |
| 32 | 417 | 6 | 0.5% NBA | ↓ | yes | no | — | |
| 33 | 417 | 6 | 1% NBA | | yes | no | — | |
| 34 | 417 | 6 | 2% NBA | ↓ | yes | no | — | |
| 35 | 417 | 6 | 1% IAA | | yes | yes | 2 | |
| 36 | 417 | 6 | 2% IAA | ↓ | yes | yes | 2 | clear solution |
| 37 | 417 | 6 | 3% IBA | 10,000 | yes | no | — | clear solution |
| 38 | 417 | 6 | 3% IBA | 20,000 | yes | yes | 2 | |
| 39 | 450 | 6 | 3% IPA | 15,000 | yes | yes | 2 | |
| 40 | 450 | 6 | 3% IBA | ↓ | yes | yes | 2 | |
| 41 | 450 | 6 | 3% TBA | | yes | yes | 2 | |
| 42 | 450 | 6 | 3% SBA | ↓ | yes | yes | 2 | |
| 43 | 450 | 6 | 3% NBA | 15,000 | yes | yes | 2 | |
| 44 | 450 | 6 | .5% IAA | ↓ | no | — | — | didn't test |
| 45 | 450 | 6 | 1.5% IAA | | no | yes | 2 | |
| 46 | 450 | 6 | No alcohol | ↓ | yes | no | — | |
| 47 | 450 | 6 | .5% IBA | | yes | no | — | |
| 48 | 450 | 6 | 1% IBA | ↓ | yes | yes | 3 | some emulsion not clear partitioning |
| 49 | 450 | 6 | 2% IBA | ↓ | yes | yes | 2 | |
| 50 | 450 | 6 | 3% IBA | 10,000 | yes | yes | 2 | |
| 51 | 450 | 6 | 3% IBA | 20,000 | no | yes | 2 | |
| 52 | 494 | 6 | 3% IBA | 15,000 | no | yes | 2 | |
| 53 | 494 | 6 | 3% IPA | ↓ | ↓ | yes | 2 | |
| 54 | 494 | 6 | 3% TBA | | | yes | 2 | |
| 55 | 494 | 6 | 3% NBA | ↓ | ↓ | yes | 2 | |
| 56 | 494 | 6 | 1.5% IAA | | | yes | 2 | |

The first seven runs show that with a low equivalent weight sulfonate partitioning did not occur even when using alcohols such as n-butyl alcohol and sec-butyl alcohol, which are of the proper solubility.

Runs 8-19 utilizing a sulfonate of the proper equivalent weight shows the dependency of partitioning upon the type of alcohol. For instance, runs 8 and 10 show that with alcohols such as isopropyl alcohol and tert-butyl alcohol which have high solubility in water, partitioning did not occur, hence, the preferred range for the solubility of the alcohol of 2 to 10 grams per 100 grams of water. In Run 12 sec-butyl alcohol having a solubility outside the preferred range was borderline showing no partitioning in this test but showing a partitioning into two phases in later run 42.

Run 18 shows that in this system with only 10,000 parts per million sodium chloride, partitioning did not occur, thus showing the advantage for the preferred range of total dissolved solids of 15,000 to 25,000 in systems using a sulfonate toward the low end of the desired range of equivalent weight. However, as can be seen from run 50, partitioning into at least two phases can occur with a concentration of sodium chloride of 10,000, hence the broader range for total dissolved solids content of 2,000 to 50,000. As can be seen comparing runs 18 or 37 and 50, increasing the equivalent weight of the sulfonate allows the use of less salt and as little as 250 parts per million can be used, hence the broad range of 250 to 100,000 TDS.

Runs 30 and 31 show the desirability of the preferred range of cosurfactant of 2 to 4 percent as 1 percent failed to give partitioning in this test, although in test 48, 1 percent was shown to be borderline, hence the broad range of 1 to 10 percent.

The significant feature is that by utilizing a sulfonate surfactant having an equivalent weight within the range of 375 to 500 and preparing only a few samples utilizing alcohols having solubility within the range of about 0.5 to 20 grams per hundred grams of water, the optimum partitioning system for a given type of oil can be determined easily. Alternatively, a given alcohol having a solubility within the range set out hereinabove can be utilized and a series of samples prepared utilizing sulfonates of varying equivalent weights within the range of 375 to 500.

Thereafter, a large quantity of a surfactant solution for field use comprising the desired sulfonate, cosurfactant, and the brine can be prepared corresponding to that which gave good partitioning in the preliminary test.

As has been noted hereinabove, surfactant flooding is well known as is the principle behind it, to wit: reduction of surface tension so as to remove the oil from the pores. However, the instant invention represents a radical departure from this known technology in that the difference between the partitioning and non-partitioning systems is not a function of how much the surface tension is lowered. Rather, the instant invention represents a three-fold advance in the art in that it makes possible the use of simple laboratory technique to determine the outcome of the system, it provides for forming a three-phase system in situ, thus avoiding the disadvantage of conventional microemulsion systems which require pumping part of the oil which has been recovered back into the system, and as will be noted hereinbelow, it surprisingly provides for more economical operation due to a reduced loss of surfactant as the water flood bank proceeds through the reservoir.

EXAMPLE III

In this series of runs, 0.1 pore volume slugs of six different surfactant systems were injected into 3-foot water-wet Berea cores containing waterflood residual crude oil. The surfactant systems were similar in composition but 3 gave partitioning results while the other 3 did not partition when subjected to the test of Example I. One of the surfactant systems was tested twice, each time in a different core.

The 7 Berea cores used in this series were very similar and had similar properties. Their specific permeabilities to water were 500–600 md, their permeabilities to brine at residual oil saturation were 26–36 md, and the saturations after waterflood varied only from 0.360 to 0.393.

Each of the cores was saturated with a synthetic formation brine, flooded with the previously described crude oil, then flooded with the formation brine to residual oil saturation. The cores were then preflushed with 1 pore volume of the same brine (about 15,000 ppm in fresh water) used later in the surfactant systems. This preflush was followed by a 0.1 pore volume plug of the indicated surfactant system, 1.0 pore volume of a 2,000 ppm polyacrylamide (Betz Hi-Vis) in fresh water mobility buffer and one final pore volume of fresh water driving fluid (one core received only 0.12 pore volume driving fluid). The rate was maintained at 0.8 feet per day during each surfactant flood. The results are shown hereinbelow in Table II.

Another showing of all of this data is that increasing salt concentration is equivalent to raising the equivalent weight of the sulfonate or decreasing the solubility of the alcohol. Thus if the salt concentration is constant and the equivalent weight of the sulfonate is increased, a more soluble alcohol must be used to compensate, or if the alcohol solubility is constant and a higher equivalent weight sulfonate is used, then the concentration of the salt must be decreased. Similarly, if the equivalent weight of the sulfonate is constant and a more soluble alcohol is used, the concentration of the salt must be increased, or if the salt concentration is constant and a more soluble alcohol is used, then a higher equivalent weight sulfonate must be used. Finally if the equivalent weight of the sulfonate is constant and the concentration of the salt is increased, then a more soluble alcohol must be used, or if the alcohol solubility is constant and a higher salt concentration is used a lower equivalent weight sulfonate must be used.

TABLE II

| | | | | | | | | |
|---|---|---|---|---|---|---|---|---|
| Comparison of Surfactant Systems in Water-Wet Berea Cores | | | | | | | | |
| | Sulfonate | | | | Partitioned | Percent of tertiary | Adsorption of Active Sulfonate | Percent of Injected Sulfonate in Effluent | |
| Run | Wt. % (eq. wt.) | Wt. % Alcohol | NaCl (ppm) | Partition | phases formed | oil recovered | (pounds/ Acre-foot) | Water Portion | Oil Portion |
| 57 | 6% (417) | 3% Tert-Butyl | 15,000 | No | — | 62 | 700 | 7 | 64 |
| 58 | 6% (417) | 3% Isobutyl | 15,000 | Yes | 3 | 80 | 800 | 7 | 57 |
| 59 | 6% (417) | 3% Normal Butyl | 15,000 | Yes | 2 | 93 | 0 | 8 | 100 |
| 60 | 6% (417) | 1% Isoamyl | 15,000 | Yes | 2 | 98 | 400 | 10 | 74 |
| 61 | 6% (450) | 3% Isopropyl | 10,000 | No | — | 97 | 1000 | 12 | 46 |
| 62 | 6% (407) | 3% Isobutyl | 10,000 | No | — | 74 | 400 | 10 | 71 |
| 63 | 6% (407) | 3% Isobutyl | 10,000 | No | — | 84 | 1300 | 8 | 47 |

Disregarding run 57 which may be low for other reasons, a comparison of the remaining six runs shows an average oil recovery of about 85 percent for the non-partitioning systems and 90 percent for the partitioning systems. While this shows an advantage for the partitioning systems, it is believed to be within the limits of experimental error. One reason the percent recovery of oil does not distinguish significantly between partitioning and non-partitioning systems is that the cores utilized were too short for the amount of surfactant solution used to clearly show an advantage for the partitioning systems.

The significant feature which is shown by the data is the adsorption of sulfonate. The adsorption of sulfonate in the partitioning systems was about 400 pounds per acre-foot, which is about half the average of 800 pounds per acre-foot adsorption shown for the non-partitioning systems. Thus, it can be seen that under actual field conditions the non-partitioning system would lose sufficient sulfonate to be rendered ineffective much sooner than would the partitioning system for a given amount of sulfonate used.

EXAMPLE IV

Cut Bank crude oil from the Southwest Cut Bank Sand Unit, Glacier County, Montana, was used in this example. Sulfonate used was 5 percent of a sulfonate having an average molecular weight of 424. The brine was Cut Bank injection water having 7,000 parts per million total dissolved solids which were almost entirely sodium chloride. The alcohol was 1½ percent of a mixture of 45 percent normal amyl and 55 percent isoamyl alcohol. Thus, the composition was 5 percent sulfonate, 1½ percent cosurfactant, 0.7 percent solids and 92.8 percent water.

This surfactant system on equilibration with the crude oil partitioned into two phases and was stable at 95° F., the temperature of the formation where this crude was obtained. This surfactant system was used in a core, injecting 0.075 pore volume and 92 percent recovery of the oil was obtained. This shows that with higher equivalent weight sulfonate and less soluble alcohols the concentration of the salt can go down.

While this invention has been described in detail for the purpose of illustration, it is not to be construed as limited thereby but is intended to cover all changes and modifications within the spirit and scope thereof.

What is claimed is:

1. A process for recovering oil from a subterranean oil-bearing reservoir comprising the steps of:
    (a) injecting into said reservoir through at least one injection well a surfactant system corresponding in composition to one which causes a separation into at least two phases upon mixing as follows: mixing samples of oil from said reservoir with a series of surfactant systems, each of said systems comprising: water; 3 to 12 weight percent based on the weight of said water of a petroleum sulfonate surfactant having an average equivalent weight within the range of 375 to 500; 250 to 100,000 parts per million by weight of an electrolyte based on the weight of said water; and 1-12 weight percent based on the weight of said water of a cosurfactant, which cosurfactant has a solubility in water within the range of 0.5 to 20 grams/100 grams of water and wherein either the equivalent weight of said sulfonate and/or the solubility of said cosurfactant and/or the concentration of said electrolyte is different in each of said systems making up said series; and wherein one of said two phases is an oil rich microemulsion containing at least 85 percent of said petroleum sulfonate;
    (b) contacting the thus injected surfactant system with said oil in said reservoir to form in situ a bank comprising (1) a phase of said reservoir oil containing a small amount of said cosurfactant, (2) a microemulsion phase comprising (a) oil from said reservoir and (b) water, surfactant and cosurfactant from said injected surfactant system, said surfactant being in substantially higher concentration in said microemulsion phase than in said injected surfactant system; and (3) a phase comprising a majority of said water from said injected surfactant system, a portion of said cosurfactant from said injected surfactant system and a minor portion of said surfactant from said injected surfactant system;
    (c) thereafter injecting a mobility buffer fluid behind said bank; and
    (d) thereafter injecting a drive fluid behind said mobility buffer thus forcing said oil on toward a recovery well.

2. A method according to claim 1 wherein said injected surfactant system is preceded by a preflush.

3. A method according to claim 1 wherein said buffer fluid is water containing 50 to 20,000 parts per million of a polyacrylamide.

4. A method according to claim 1 wherein said cosurfactant is isobutyl alcohol.

5. A method according to claim 1 wherein said sulfonate has an aqueous equivalent weight within the range of 407 to 417.

6. A method according to claim 1 wherein said electrolyte is primarily NaCl present in the concentration within the range of 2,000 to 50,000 ppm based on the weight of said water.

7. A method according to claim 1 wherein said injected surfactant system is essentially free of oil.

8. A method according to claim 1 wherein said cosurfactant has a solubility in water within the range of 2 to 10 grams per 100 grams of water.

9. A method according to claim 1 wherein said injected surfactant system is essentially free of oil and is preceded by a preflush, said buffer fluid is water containing 200 to 5,000 parts per million by weight of a polyacrylamide, said cosurfactant is isobutyl alcohol, and is present in an amount within the range of 2 to 10 weight percent based on the weight of said water, and said sulfonate is present in an amount within the range of 4 to 8 weight percent based on the weight of said water, and has an equivalent weight within the range of 407 to 417, and wherein said electrolyte is primarily NaCl and is present in a concentration within the range of 2,000 to 50,000 ppm based on the weight of said water, said water and said NaCl together being present in an amount within the range of 85 to 95 weight percent based on the total weight of said water, NaCl, sulfonate and cosurfactant.

10. A method according to claim 1 wherein said formation is oil wet.

11. A method according to claim 1 wherein said formation is water wet.

12. A method according to claim 1 wherein said oil is a mid-continent crude characterized substantially as follows:

| | |
|---|---|
| Base type: | Intermediate |
| Gravity, ° API at 60° F | 39.1 |
| Pour Test, ° F. | +20 |
| Sulfur, % | 0.15 |
| Hydrogen Sulfide | Negative |

13. A method according to claim 1 wherein said sulfonate has an average equivalent weight of less than about 435 and/or said cosurfactant has a solubility of more than 5 g/100 g of water and said electrolyte comprises NaCl in a concentration within the range of 10,000 to 50,000 ppm.

* * * * *

UNITED STATES PATENT AND TRADEMARK OFFICE
CERTIFICATE OF CORRECTION

PATENT NO. : 4,079,785
DATED : March 21, 1978
INVENTOR(S) : James E. Hessert et al It is certified that error appears in the above-identified patent and that said Letters Patent are hereby corrected as shown below:

Column 2, line 66, "to 50,000" was omitted, should be --- 10,000 to 50,000 ---, see page 5, line 2.

Column 3, line 14, "combination" should be --- combinations ---, see page 5, line 13.

Column 6, line 3, "0.40" should be --- 0.04 ---, see page 10, line 21.

Signed and Sealed this

Fifteenth Day of August 1978

[SEAL]

Attest:

RUTH C. MASON
Attesting Officer

DONALD W. BANNER
Commissioner of Patents and Trademarks